US008820078B1

(12) United States Patent
Duffy

(10) Patent No.: US 8,820,078 B1
(45) Date of Patent: Sep. 2, 2014

(54) HEAT RECOVERY STEAM GENERATOR AND METHOD FOR FAST STARTING COMBINED CYCLES

(71) Applicant: Thomas Edward Duffy, San Diego, CA (US)

(72) Inventor: Thomas Edward Duffy, San Diego, CA (US)

( * ) Notice: Subject to any disclaimer, the term of this patent is extended or adjusted under 35 U.S.C. 154(b) by 41 days.

(21) Appl. No.: 13/987,540

(22) Filed: Aug. 6, 2013

(51) Int. Cl.
*F01K 13/02* (2006.01)
*F01K 7/34* (2006.01)
*F01K 19/00* (2006.01)
*F01K 7/22* (2006.01)
*F22B 1/00* (2006.01)

(52) U.S. Cl.
CPC .................................. *F22B 1/00* (2013.01)
USPC .............. 60/646; 60/653; 60/657; 60/679

(58) Field of Classification Search
USPC .................................................. 60/645–681
See application file for complete search history.

(56) References Cited

U.S. PATENT DOCUMENTS 5,379,588 A * 1/1995 Tomlinson et al. ........ 60/39.182

* cited by examiner

*Primary Examiner* — Christopher Jetton

(57) ABSTRACT

A once-through high pressure steam generator and reheater configured to eliminate the majority of components limiting cyclical life of fast start conventional HRSGs. Two remaining problematic components in conventional designs the final superheater and reheater tubes overheat while their headers remain colder in fast starts. In this inventive HRSG the critical components are arranged and started by a method that limits these damaging temperature differentials. At ignition when exhaust gas surges into a wet superheater steam flow starts minutes before conventional systems. This early steam flow cools the tubes while heating the headers, thereby reducing life damaging stresses. Steam temperature is controlled through the start and warms the rest of the plant earlier without attemperators with their problematic thermal stress history. Faster starts than conventional result without damaging fatigue life depletion with this low cost innovation.

5 Claims, 4 Drawing Sheets

HEAT RECOVERY STEAM GENERATOR AND METHOD FOR FAST STARTING COMBINED CYCLES

BACKGROUND OF THE INVENTION

The present application discloses systems and methods to fast start high pressure heat recovery steam generators (HRSGs) to minimize thermal stress failures experienced by conventional HRSGs. Thousands of Combined Cycle (CC) power plants have been installed and are operating throughout the world. In first thirty years most were installed as base load and designed to be started only a few dozen times a year. Operating experience on many proved that start-stops initiated the greatest damage obliging major repairs, replacement and reduced availability in only a few hundred start cycles for many sites. Increasing the requirement to start faster and more times a year on higher pressure combined cycles necessitates innovative systems and methods focused on solving this proven industry problem. At present CC are often specified to cycle daily and even hourly to load follow and start in 30 minutes (to accommodate solar and wind power variability). To match advances in gas turbine technology with resultant high exhaust temperatures, steam pressure, and steam temperature has been increased to improve efficiency, power density and reduce specific costs of power. These requirements thereby result in increasing thermal stresses and mechanical problems for new HRSGs designs still basically using the same designs as the past conventional HRSG configurations. Improvements have been incorporated in some units through incorporation of the once-through Benson design that eliminates the thick wall high pressure drum a practical necessity as steam pressures move ever higher. However, large HRSG designs still incorporate thousands small diameter vertical thin wall finned tubes (20 to 30 meters long) connected at the top and bottom to thick wall headers in 70 to 90 rows. Often two or three rows are welded into a single header rigidly constraining each tube ends. The Lower headers are free to expand downward to accommodate the average expansion of two or more rows of tubes welded across the length of the header. This highly rigid design has proven to be acceptable for base load even though tube rows have different temperatures in the same header. During fast starts higher temperature differentials exist between tube rows, tubes in the same row and thick wall headers. After a number of start cycles the differential temperatures result in failure of weld joints and tubes. The use of bypass exhaust stacks are necessary in many installations to allow gradual warm up to prevent failure but are not fast starters and result in efficiency loss. This is a problem is especially acute during fast starts and shutdowns of high pressure HRSGs even with the Benson HRSG that only solves the thick wall high pressure drum problem by eliminating it entirely.

Thermal shock during starts is a result of rapid differential radial and lengthwise tube expansion eventually causing numerous weld joint cracks, tube cracks and tube buckling with the top and bottom header configurations installed in conventional units. Particularly vulnerable are the high pressure superheater and reheater header to tube joints and tubes. During the start sequence the thin wall tubes in the high pressure superheater and reheater rapidly heat much faster than the headers. After ignition in the combustion gas turbine little or no steam flows in the superheater or reheater to cool the tubes that rapidly heat to approach the exhaust gas temperature in the first few minutes. The thick wall headers metal temperature remains at a lower temperature taking 600% longer than the superheater and reheater tubes to approach operating temperature. This severe lag occurs because the headers temperature rise is determined by steam flow steam initiated from the downstream thermally massive evaporator section of the HRSG. Differential temperature of several hundred degrees between the tubes and headers eventually results in fatigue cracking of tube to header welds. Rapid tube length expansion and different tube temperatures row to row is constrained by the upper and lower rigid headers bending stresses on the joint and often to buckled tubes.

Cold starts cause the highest fatigue damage, to minimize damage in cycling duty the HRSG is bottled up overnight and kept at as high a steam pressure possible. When started the superheater has stagnant saturated steam that condenses in the tubes during the start ramp. Condensate forms as a result of motoring the gas turbine for about ten minutes to circulate cold air to purge ducting and the HRSG of possible explosive gases prior to ignition. Water condensate from the saturated steam in the tubes collects in the lower headers and interconnecting pipes and has proven difficult to drain prior to the initiation of steam flow. In many units as steam flow is initiated many minutes later the condensate water is stripped out of the lower headers and forced downstream unevenly across the rows of the now very hot superheater tubing quenching tubes unevenly. As a result some tubes go into tension and other tubes buckle and the fatigue life of tube to header weld joints is reduced in some units to only a few hundred start cycles. The invention method eliminates the lower headers and fills the tubes with saturated water eliminating this problem.

Another condensate cause of thermal strain is shutdown from high power (trips). During turbine trips compressor spin-down circulates cold exhaust air flow through the superheater and reheater tubing producing condensate as the tube metal temperature is reduced to the saturation temperature of the steam in the evaporator, condensate hundreds of degrees colder than the hot header metal quenching the hot lower headers and pipes. Cracking of lower tube weld joints, header tube bores and distortion of headers and pipes can result from this thermal shock quenching particularly with the high temperatures required for new high pressure CC power plants. No viable solutions to this damage have been obtained with the conventional HRSGs. The invention eliminates the thick wall lower headers and replaces them with thin wall tubes formed in U-bends.

Another source of water quenching damage is interstage attemperation in the high pressure superheater and reheater. During starts the conventional HRSGs require attemperation water sprays into the thick wall interconnecting piping between superheater and reheater headers to prevent over temperature during the start when steam flow is low and gas temperature is high. Spraying water into these pipes is another major observed cause of thermal shock damage in many units. Overspray is a common and difficult to prevent control problem due to lag times and lack of long strait pipe lengths in the interstage pipes between stages. During starts and other operating modes water spray often impinges on pipe wall quenching them, is then stripped from walls quenching headers and tubes downstream causing cracks.

BRIEF SUMMARY OF INVENTION

The disclosures discussed in this application increases cyclical life and availability of fast starting HRSGs by systems and methods. It eliminates many critical failure points and components and lowers damaging differential temperatures of the remaining critical components during rapid starts to increases cyclic life. The object of the invention is:

Reducing the damaging differential temperatures in the superheater and reheater outlet header weld joints and tubing by cooling them with saturated water and low temperature steam during starts;

Eliminating many primary failure points, >90% tube to header weld joints removed;

Eliminating all lower headers and associated thick wall piping and complex drain piping and control valves that constitute constraints to expansion;

Eliminating >80% of the upper headers using only inlet and outlet headers for each pressure level;

A method to control steam temperature during off design: low gas flow, supplemental firing or high ambient temperatures without installing attemperators;

Eliminating attemperators in the HRSG;

A simple automated method to nitrogen blanket the HRSG for cyclical service;

A simple automated method to dewater and fill the HRSG with dry nitrogen for lengthy shutdowns;

Reduce initial, operating and maintenance costs.

This disclosure will also improve HRSGs part load and high ambient temperate efficiency at the same time as reducing installed and repair costs. A key technology from prior art in this approach is a once-through steam generator circuit for at least for the high pressure and high reheat sections. This once-through circuit is uniquely modified to meet fast start requirements using all standard code approved tubes and does not require special high alloy tubes. The once-through configuration eliminates the thick wall drum a major constraint to a fast start capability. It also is essential for supercritical combined cycles and useful in intermediate and low pressure sections of multi pressure HRSGs to eliminate drums and other components sensitive to cycling. Additionally the once-through assembly has high thermal expansion flexibility capability. One such HRSG is described in U.S. Pat. No. 6,019,070 "Circuit Assembly for Once-Through Steam Generator" by Thomas E. Duffy, a mechanical design for large vertical tube once-through HRSG useful in the system described herein. However, this application is not limited to U.S. Pat. No. 6,019,070 configuration alone. Other once-through designs are in operation or have been tested with a working fluid flow path suitable for the system described herein. Approximately 200 smaller HRSGs with a required once-through water flow path (but with horizontal tubes and higher cost high alloy tubes to allow fast starts) have been installed in many 35 to 60 MW combines cycles. All these units have fast cycling capabilities using high alloy tubing to facilitate fast starts and are arranged using parallel once-through circuits from water in to steam out as is described herein but in a horizontal tube arrangement. This invention is also useful for horizontal tube configured HRSGs allowing fast starts and while permitting the use of low alloy tubing to save costs. In the inventive once-through arrangement described herein each circuit is an individual steam generator that is started with all parallel circuits completely filled with saturated water. As described in U.S. Pat. No. 6,019,070 large 200 to 600 MW HRSGs for CC plants with vertical tubes are mechanically optimum and vertical tubes are installed in the majority of conventional combined cycles using natural circulation or Benson once-through designs. None are like the once-through HRSG with individual circuits from inlet to outlet as described herein that can solve the multitude of fast start problems achieved by this invention with standard low alloy code materials.

The invention arranges a unique the once-through steam flow path reheater downstream of the final high pressure superheater in the direction of the exhaust gas flow. The unique once-through reheater does not incorporate lower headers and attemperators as in conventional HRSGs. During a gas turbine start exhaust gas surges into the first gas side tubing row of the final superheater at temperatures often in excess of 670° C. (for some turbines) during gas turbine acceleration. In a conventional HRSGs the superheater is filled with stagnant saturated steam from the high pressure drum for a hot start or air for a cold starts. In the invention, to minimize thermal shock the superheater, prior to start is maintained full of water at saturation temperature about 250° C. (for an overnight hot start) For a cold start the superheater tubes would be filled with ambient air temperature water. The high specific heat and high heat of vaporization of water will cool the tubes during this sudden surge preventing the damaging temperature rise plaguing conventional HRSG superheaters. Following ignition at the high pressure final superheater header a high capacity blow down drain system is opened and swell water is discharged to the condenser through a desuperheater drain system to control pressure rise rate. Simultaneously water flows out of the superheater through a drain system on the feedwater inlet row of the high pressure steam circuits. A drain tube on each circuit inlet allows water to flow from each final superheater circuit since they are hydraulically coupled through the serpentine tubing to the drain tube at the water inlet row of each circuit. Water flow rate out of the superheater is controlled by a single circuit drain control valve to control the steam outlet temperature as dry steam is produced within minutes. When outlet steam temperature is stabilized, as dry steam, it leaves the header through a steam control valve to the main steam line. Steam 50 to 80 degrees above saturation temperature start warming lines to the bypass valve and initiates cooling steam flow to the reheater within a few minutes of ignition. Steam flow is initiated many minutes earlier than in conventional HRSGs and is at a much lower temperature. As the evaporation dry out location in the final superheater row is lowered below the header the steam temperature increases and becomes available to warm the rest of the plant. The circuit drain control valve operates in coordination with the header steam outlet steam control valve control pressure and temperature. Through use of the invention, the superheater tubes and header both start warming up from saturation temperature as the turbine accelerates. In the conventional units the header stays at near initial saturation temperature while the thin wall tubes rapidly increase to the exhaust gas temperature in a few minutes since little or no steam flow is started during this part of the start ramp. This patent greatly limits the differential temperature as the start sequence continues. By controlling the location of the dryout zone with the drain flow control valve the final superheater outlet temperature ramps up to safely warm the main steam piping, reheater and steam turbine. Attemperation used to control peak outlet steam temperatures in conventional superheaters and reheaters are eliminated through this controlled temperature ramp. Elimination of attemperation water spray also eliminates the extensive thermal shock damage observed in conventional HRSGs.

In a start the reheater header joints and tubes are protected by the invention by three methods, first the exhaust gas entering the reheater is initially cooled by the final superheater operating as an evapotator reducing gas temperature by hundreds of degrees at the reheater position just downstream compared to conventional starts. A second protection; dry steam flow at low temperature is initiated within a few minutes to start cooling flow into reheater to prevent tube overheating and eliminate the need for an attemperator. The steam flow simultaneously starts heating the headers minimizing differential temperatures. A third protection is elimination of the rigid bottom headers and tubing joints to headers.

Another important aspect of the invention is the ability of the arrangement and methods to enable control of the location of the dryout zone. Adjusting the location of the dry out zone from the evaporation section into the superheater will prevent over temperature in the final superheat steam at low steam flow during start and part load operation, (where some gas turbines exhaust temperature remain high), or during high ambient temperature conditions and other off rated design conditions. This approach also allows elimination of attemperators in the high pressure superheater and reheater. In coordination with the feedwater control valve the circuit drain control valve can rapidly open to prevent overshoot in temperature as since the temperature sensitivity with low superheater area is increased. The high pressure circuit drain control valve is also operated to prevent negative transients in steam temperature caused by rapid gas turbine load sheds reducing gas temperature into the HRSG. In this transient the dry out zone can be rapidly moved toward the economizer preventing quenching of the outlet header by increasing the superheater area. In addition to rapid transients the variable area control features permit off-design steam outlet conditions to be optimized for ambient air temperatures variations thereby resulting in greater cycle efficiency increasing economic performance in most climates.

Since all lower headers are eliminated by the invention and replaced with thin wall U-bends or similar thin wall jumper tubes an innovative method to start and dewater the HRSG is incorporated. In cycling service after shutdown thermal energy is conserved by keeping the steam pressure as high as possible by isolating the HRSG. After the superheater outlet header cools to a safe level (assisted by the cold air during the spin down period after turbine trip), feed water flow is initiated. Low feedwater flow rate slowly moves evaporator water into the superheater and fills it with saturated water. The final superheater header receiver drain system is partially opened during the fill process and closed when water is sensed by its level controls. Once full the HRSG would be ready for a restart. If the plant trip was unplanned and a restart required immediately the superheater header would stay sufficiently hot and not require filling with saturated water from the evaporator. In this situation the reheater header would also be hot and little cyclic life would be lost by starting immediately after gas turbine trip to produce power as soon as possible.

Shutdowns for a weekends or when steam pressure falls near atmospheric pressure nitrogen is introduced through the high pressure header replacing condensing steam and prevent a vacuum forming and possible air in leakage. For long term storage and for maintenance requiring opening the steam side to air the water in the HRSG would be purged of water by a simple air blowdown of the water side through to circuit drain control valve to a feedwater storage tank. Dry nitrogen would be circulated for sufficient time to purge the air and limit moisture content and ensure 99.6% nitrogen fills the entire waterside of the HRSG to protect it from corrosion.

DETAILED DESCRIPTION OF THE INVENTION

Figure 1:
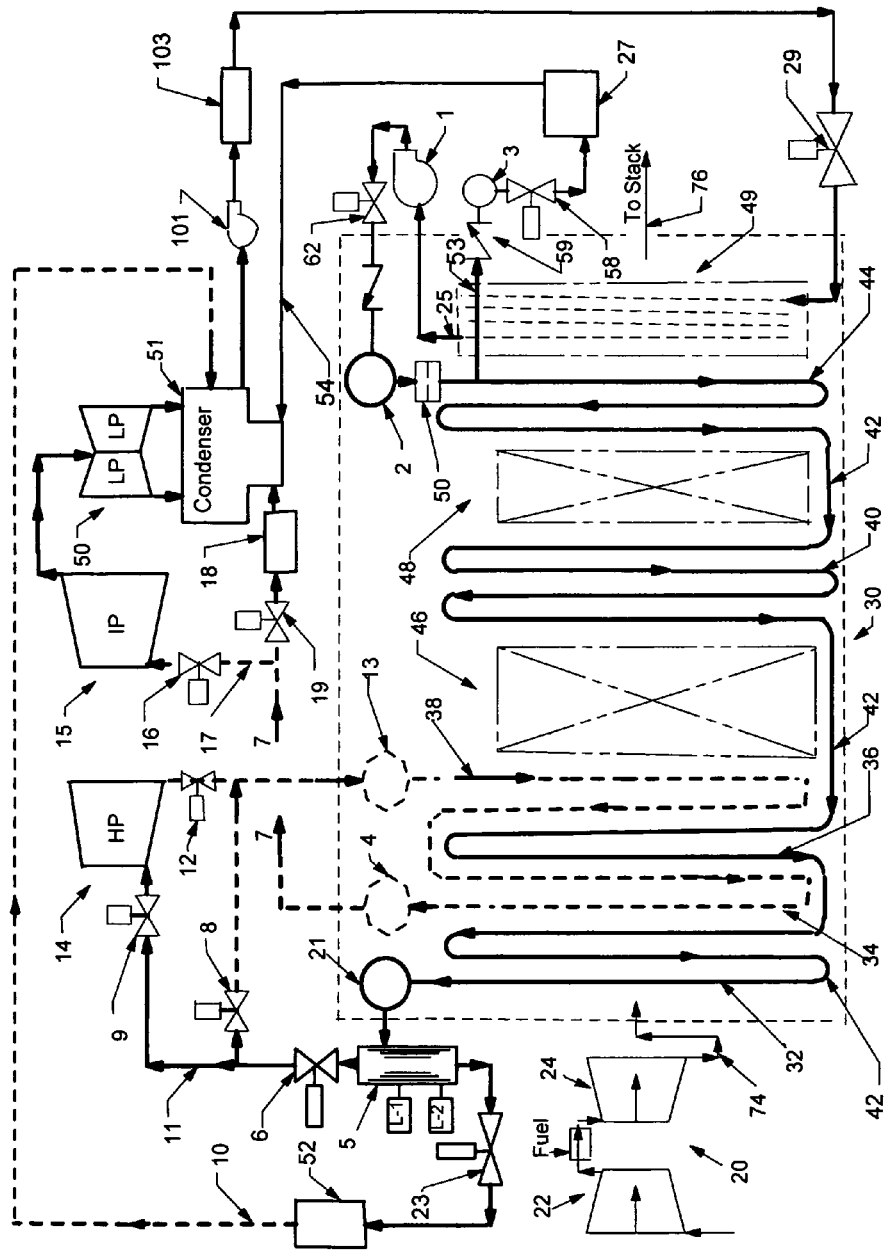
FIG. 1 schematically illustrates a HRSG in a CC system that implements the invention.

The current state of the art for HRSGs has several problems that reduce the fatigue life of many high temperature components when required to start fast in cyclical operating duty. The invention can be especially useful with high pressure or supercritical steam combined cycles and reheaters. The invention solves these problems by eliminating components and reducing differential thermal stresses during start. An embodiment of the present invention, FIG. 1 is a schematic of a CC with a three pressure reheat steam HRSG 30. The inventive concept may be incorporated in a single pressure supercritical combined cycle or multi-pressure combined cycle with dual pressure and single pressure cogeneration CCs with and without one or more stages of reheat. It is also applicable to supplementary fired CCs, and steam injected gas turbine HRSGs.

The embodiment, FIG. 1 includes a gas turbine system 20 comprising a compressor 22, a combustor fuel system and a turbine section 24 that typically driving a generator (not shown). Exhaust gases 74 exiting from turbine and enter the HRSG 30 ducting and housing which may include supplementary firing. Numerous safety valves, drain valves, vents and other components commonly known in steam plant art are not included to describe the essentials of the invention clearly.

In this embodiment steam produced in the HRSG at three pressure levels and is conducted to the steam turbine system to produce work in the high pressure steam turbine 14, the intermediate turbine section 15 and the low pressure turbine section 50. Only the high pressure steam circuits and intermediate pressure reheat circuits are described in detail to illustrate the main benefits of the invention. However the invention is also useful in the intermediate and low pressure steam systems for many of the same benefits. Steam discharged from the low pressure turbine into the systems condenser 51 returning it to water where a condensate pump 101 normally conducts it to an all volatile water treatment system 103, usually including: filters, full flow condensate polishing system, pH and oxygen control systems to provide feedwater suitable for a once through steam generator. Feedwater treatment system 103 will also include a deaeration system if a condener vacuum deaeration system is not employed in condenser 51. From the condensate water treatment system the feedwater is pumped to HRSG 30 completing the basic water steam cycle. The CC is typical to conventional technology systems throughout except for innovations described herein. Other components such as safety valves line heating sub systems, drains and vents are not shown since they are conventional and well understood by those trained in the art.

In accordance with and embodying the principles of the present invention at least the high pressure section of the HRSG 30 is a once-through steam generator configured with serpentine flow path arranged with vertical finned heat transfer tubes with the final superheater 32 installed at the entry end where turbine exhaust gas enters the gas side of the HRSG casing. This places the places the final high pressure superheater 32 in the highest gas temperature 74 enters the section. The final reheat section 34 is the next section disposed immediately downstream of 32. Only the location of the final superheater 32 and the final reheater 34 constitute the best embodiment of this invention. All other sections as disposed in FIG. 1 may be located in different places to optimize performance for specific gas turbines or other reasons and are not essential to the benefits described by the inventive concept. One or more high pressure superheater sections are located further downstream in the gas flow direction dispersed with other lower pressure heat transfer sections to maximize performance. In this example a second or lower temperature high pressure superheater 36 is shown downstream of the final reheater 34. The low temperature superheater 36 and the second cold reheater 38 may be located further downstream into evaporator sections and pressure level optimization depending upon exhaust gas temperature 74. Location of the lower temperature cold reheater section 34 could also be placed further downstream in evaporator sections also depending upon trade-off optimization. In multi-pressure CC other pressure level sections such as the described intermediate pressure 46, low pressure 48 and preheater 49 are generalized as simplified box sections with dashed outlines simplicity since the location of their subsections is not important to this detailed description. Other sections such as double reheater, catalytic convertors, fuel gas heaters and maintenance spaces between heat exchange sections may also be also disposed within the high pressure steam generator of the HRSG. If others are incorporated, or not, the benefits of the concept will still be realized. Any number of other sections can be easily located into the concept by replacing the U-bends with longer jumper tubes 42. The number of vertical heat transfer tubes shown in FIG. 1 is to illustrate the concept concepts and many more tubes are used in practice.

The high pressure steam generator is a heat transfer circuit constructed of long vertical finned tubes in with many rows connected together with U-bends at top or bottom to form an continuous independent circuit of water to steam flow directly from the high pressure water inlet header 2 to the high pressure final superheater outlet header 21. The final superheater outlet 21 is at the gas turbine exhaust gas 76 entry to the HRSG. Inlet water header 2 is at the exit of the gas 76 where exhaust gasses are discharged to the stack. Approximately twenty to eighty circuits placed in parallel form the complete heat transfer modules of a HRSG. Reference 1 describes the mechanical design of one arrangement of a once-through circuit assemblies with each circuit independently supported from the top with a high degree of flexibility to expand downward. The tubes also have significant space to move upwards in most rows. Because of the relative low constraint of U-bends attached to long small diameter tubes, (compared to a header) the U-bends are relatively free to rotate at top and bottom to minimize stress. Each circuit can expand downward and in the gas flow direction independently without constraint from its adjacent circuit. The inlet water header does not constitute a fast start problem and the methods described in this patent eliminate most of the final high pressure superheater outlet row problems. The arrangement using only inlet and outlet headers for each pressure most header weld joints are eliminated and remaining are protected by cooling in the inventive method of operation.

The reheater sections 34 and 38 are shown with the first high pressure superheater 36 located between them. They are similar in construction to the superheaters also incorporating a once through flow path connected in a serpentine flow path with U-bends and jumper tubes connecting the heat transfer tubes. Exhaust steam flows through valve 12 from the high pressure turbine is conducted to the Cold reheat header 13 connected to the cold reheater circuits 38. Section 38 is connected to the final reheater circuit 34 by jumper tubes. The conventional HRSG lower headers are replaced by the small diameter U-tubes thereby eliminating the problematic rigid headers and interconnecting pipes and troublesome drainage piping and valves. The hot reheat steam is discharged by the many parallel reheat circuits into the final reheat steam header 4 and through line 7 to the intermediate steam turbine valve 16 and or to turbine by-pass valve 19 during transient operations of the CC.

Many individual circuits are supported from the top transversely across gas flow 74 to 76 path through the HRSG to the stack 76. High pressure feedwater pump 1 raises the water discharge pressure from the preheater 49 to suitable pressure for the high pressure system. Although the preheater is common in conventional units this function can also be incorporated directly in the high pressure circuit and the alternative configuration does not affect the embodiment of this invention. Feedwater flow from the high pressure feedwater control valve 62 enters the inlet water header 2 through a check valve. Each circuit is connected to the header through an inlet water restrictor 50 to provide uniform flow to each parallel circuit and to ensure stability. At the outlet end of each circuit it is welded to a high pressure final superheater header 21. Final reheater section 34 is immediately downstream of the final high pressure superheater 32. This provides a lower temperature environment for the uncooled reheater during the beginning of the start ramps.

In normal full power operation steam produced in the HRSG high pressure steam circuits flows from the high pressure header through the high pressure header receiver 5 through the main steam isolation-control valve 6 to the main steam line 11 to the turbine through the high pressure steam turbine isolation valve 9 and expanded in the high pressure turbine 14 and exhausted to the reheater through high pressure steam turbine discharge valve 12 and then into the cold reheater header 13. After passing through the reheater it is discharged from the final reheater header 4 into line 7 and conducted to the intermediate pressure steam generator 46 superheater discharge line 17. The two steam flows are in mixed in 17 and (connection from 46 to 17 not shown for clarity) conducted through the intermediate turbine control valve 16 to the intermediate turbine 15. Steam exhausting from the intermediate turbine 15 is mixed with steam from the low pressure steam generator 48 and expanded through the low pressure turbine 50 to the condenser 50. The turbine bypass valve 8 is closed, the high pressure receiver drain valve 23 is closed and the reheater warm-up valve 19 is also closed. For clarity steam lines from the intermediate pressure and low pressure steam generators are not illustrated in FIG. 1.

To start the HRSG from cold the high pressure circuit is filled by feedwater pump 1 with polished deionized and deaerated feedwater until the water flows through the headers to a vertical header drain receiver 5. The receiver 5 is installed adjacent to the headers discharge line outside the casing. Receiver 5 is positioned to be close to the high pressure steam outlet header 21 (or headers in multiple module HRSG arrangements). In this close coupled manner they can rapidly fill with water or a mixture of water and steam during a start. Sufficient volume in the receiver is incorporated in the receiver to receive the swell mixture from the headers and drain it during fast starts. Level sensors in the receivers establish that the headers are full and the HRSG is ready for a start. A few minutes before ignition and gas turbine acceleration the header receiver drain valve 23 opens thereby draining the water in the receiver to the condenser 51 through line 10 and desuperheater 52. As an alternative the receiver can be drained to a feed water storage tank (not shown) depending upon power plant layout. In synchronization with the receiver drain valve 23 at the opposite end of the HRSG the circuit drain control valve 58 opens discharging water from each circuit through to the flash tank 27 at the HRSG and from 27 to the condenser or feedwater tank. In a cold starts opening an air vent valve at the top of the receiver (not shown) permits the gravity head to empty the receiver of water. After ignition the first row of water filled high pressure superheater 32 is rapidly exposed to hundreds of pounds per second of high temperature exhaust gases at temperate that exceed 670° C. (in some turbines). As the turbine accelerates the water in the final superheater 32 rapidly heats and starts to evaporate to steam and its volume rapidly swells draining through the fully open receiver drain valve 23 and circuit drain valve 58. By modulating valve 23 and 58 the steam pressure will be controlled reducing the volume as the steam bubbles are compressed and the water level in the superheater 32 is reduced rapidly eliminating swell flow. In this manner drain valves controls the steam pressure generated in the high pressure superheater 32. The water flows away from the final superheater through the circuits and through a check valve 59 in each circuit drain line 53 into the circuit drain header 3. By means of this feedwater drain system the dryout zone location in the final superheater is adjusted to control steam outlet temperature during the start sequence. Since the dry out zone is initially in the last row of the final superheater 32 (transfer area is initially very small) a controlled steam temperature rise in discharge steam temperature can be programmed. Thus compared to conventional HRSGs where steam flow starts at nearly gas temperature requiring water spray attempting to limit over temperature the invention provides a low controlled temperature ramp preventing over temperature and reducing thermal stresses. Therefore from initially low temperature (relative to inlet gas temperature) through to full load a controlled steam temperature is delivered to warm up the CC by adjusting the position of the dry out zone. With this method the thin wall tubes attached to the thick wall header are cooled by the steam flow and the headers are heated in a controlled manner to prevent the high temperature differentials suffered in conventional HRSGs. Within a couple of minutes low temperature dry superheated steam becomes available as soon as the volume of swell water is discharged and the evaporation dry out zone is shifted approximately ten meters below the high pressure final outlet header 21 by means of drain flow control through the circuit drain valve 58. The circuit drain valve 58 controls the steam outlet temperature to confirm dry steam. In conventional HRSGS differential temperatures of hundreds of degrees occur during start since steam flow cannot be initiated in the superheater for many minutes because the massive natural circulation evaporator downstream takes excessive time to heat and generate significant steam flow. In starts conventional HRSGs steam flow to cool superheater and reheater tubing approaches gas temperature within a few minutes while the headers remain cold without steam flow to heat them. In typical conventional HRSGs it takes over twenty minutes to reduce differential temperatures that damage their cyclical life.

By sensing engine speed, fuel flow, guide vane position and exhaust temperature as inputs to control the drain valves 58 and 23 a predictive valve control schedule is programmed to control the rate of change of temperature and pressure of outlet steam. Sensing steam temperature and pressure of the outlet steam flow will provide a closed loop feedback trim. By starting the high pressure superheater 32 as an evaporator not only are the damaging differential temperatures of conventional systems reduced in the superheater but the high pressure superherter 32 shields the reheaters 34 and 38 so they experience gas temperatures hundreds of degrees lower with corresponding greatly reduced stresses and loss of cyclical life. With this innovative method dry superheated steam flow is initiated much earlier in the start sequence to the main steam line 11 through the main steam line control valve 6 while receiver drain valve 23 is controlled to close as dry steam is sensed in the receiver. High pressure turbine by pass control valve 8 is opened to start heating piping and headers and cooling the reheater tubes. Concurrently the steam flow heats headers 13 and 4 and cools tubing in reheaters 38 and 32 and heats the reheater headers reducing the peak differential temperatures in critical header joints and tubes in the reheater. Therefore a faster start ramp can be obtained for the HRSG and the CC.

An important benefit of the innovative method greatly lowers the temperature of the entire length of all reheater tubes during the first critical minutes of the start ramp. The unique method and configuration results from using the final superheater as an evaporator during start sequence. This lowers gas temperature into the reheater 34 by more than 200° F. When combined with the timely flow of cooling steam into the reheater excessive temperatures of steam discharging from the reheater header 4 can be limited without attemperators in the reheater. The injection of cold water in the attemperator is thereby eliminated as is the thermal stresses afflicting conventional HRSGs that inject cold water in interconnecting header pipes to control over temperature. A benefit of the patent is the elimination of the lower headers required to install attemperators and interconnecting thick wall piping and rigid constraints hindering tube expansion. Thus the inventions use of U-bends at the bottom of all tubes in reheaters allows comparatively lower constraint restricting expansion and tube joint rotation.

The final superheater components are even better protected from over temperature during start transients since the tubes and headers remain near saturation temperature for the first minutes of the start ramp as water swells and is discharged. As the cycle ramp progresses the dry out zone is moved down and away from the outlet header and dry steam flows through high pressure suprerheater outlet steam header 21 and in the final row of tubes in of high pressure final superheater 32 attached to header in a controlled manner allowing both to simultaneously heat. Outlet steam temperature from the high pressure superheater header 21 during fast starts is controlled by controlling the position of the dryout zone in combination with the feed water control valve 62 regulation of inlet flow after dry outlet steam is stabilized. As a result attemperation is not necessary to limit outlet temperature during start or any other low gas flow operations with high exhaust gas temperature operation of the gas turbine. Outlet steam temperature is effectively controlled by changing the area of the superheater. By increasing the area above the dryout zone in the superheater tubing an independent control of high pressure steam temperature is achieved. For conditions such as low steam flow during part load or high ambient temperature this condition this additional control eliminates the requirement for an attemperator.

Cold fast starts described above can be the most severe on the life of HRSGs a hot start can also seriously reduce life. This patent eliminates many of the components exposed to hot start problems and reduces the severity of the other thermal stresses as the method described above for cold starts. HRSGs in cyclical operating service can be required to start over 250 times a year. To decrease thermal transient damage and fuel costs, emissions and minimize start times the HRSG is maintained at as high a temperature as possible after shut down in daily cyclic service. A typical cycle would be overnight shutdown and start in the following morning. With this operating sequence the HRSG is bottled up and kept at saturation pressure that decays slowly overnight as the mass of water retained in the drum and evaporator tubing plus other heat sources cool below their operating conditions while shutdown. The reheaters 34 and 38 are vented to the condenser 51 through intermediate turbine bypass line 7 while still hot to reduce condensation as components cools overnight to near saturation temperature. To prepare the high pressure superheater 32 for the next start the saturated water from the evaporator is pumped into the high pressure superheater after it cools to near saturation temperature. Overnight the superheaters 32 and 36 will normally cool to near saturation temperatures depending on how well the HRSG is insulated and bottled up. The saturated water from the evaporator can be pumped into the superheater 32, header 21 and high pressure header drain receiver 5 without significant thermal differential temperature. Opening the low pressure feedwater control valve 29 and high pressure feedwater control valve 62 pumps water through the serpentine tube arrangement from the high pressure economizer 44 to the superheater 32 using pressure from feed water pumps 101 and 1. From this condition the method is similar to the cold start with the superheater 32 after ignition evaporating the water in its tubes to protect headers and tubing in the superheaters directly and indirectly the reheaters during the potentially damaging fast start transients.

An additional advantage of the method in the hot start case is it eliminates a serious quenching problem that has been observed. In a hot starts with conventional HRSGs immediately prior to ignition cold air is forced through the HRSG for ten to fifteen minutes to purge it of possible explosive gasses. In this process a considerable mass of water is condensed in the superheater and must be drained. Experience from the field shows condensate often fails to fully drain water migrates forward internally as steam starts to flow, resulting in severe damage to superheater components. In a conventional HRSGs the superheater tubes heat rapidly to near exhaust gas temperature without cooling steam flow since there is no cooling flow for many minute. When steam flow commences from the downstream evaporator it is at high velocity and strips drain water in the headers and connecting header piping forward quenching hot tubing in the superheater. In the invention the superheater 32 tubing is full of saturated water slowly warms together with the header as steam flow is initiated.

In the case of power dispatching to load follow, starts may be frequent without time to let the superheater header to cool. Also in the case of an unscheduled plant trip the HRSG must be started as fast as possible. For these cases a different operating method is used for the invention. The tubing in the superheaters and reheaters will be slightly superheated or near saturated steam temperatures from the cold air circulated around them during the spin down of the gas turbine. There are three components that must be cooled in this case of a fast start. The high pressure superheater header 21, the header drain receiver 5 and drain valve 23 will remain too hot to fill with saturated water without cooling first. To cool these components saturated steam from the evaporator 40 is vented through the superheater header 21 and receiver 5 by opening drain control valve 23 and discharging the steam to the condenser 51 through desuperheater 52. Only a small percentage of mass of saturated water needs to be flashed to steam to cool the header 21. Cooling is also assisted by the ten to twenty minutes when cold air is forced through the HRSG by motoring the turbine to purge the HRSG of possible combustible gases prior to start. When the header is cooled to near saturation temperature of the water the superheaters 36 and 34, header 21 and receiver 5 are filled with saturated water by use of the high pressure pump 1 and high pressure feedwater control valve 62. During this start sequence the high pressure turbine bypass valve is opened and reheaters 34 and 38 are vented to the condenser through desuperheater 18 by opening intermediate turbine bypass valve 19 and closing high pressure turbine exhaust valve 12. The reheaters surrounded by high temperature saturated water in the superheaters will evaporate any condensed water in the bottom of the U-tubes and ensure that no water is carried forward when steam flow is initiated. When the superheater is full of water the start then is the method described earlier for a cold start.

The invention also reduces thermal cycling damage observed in conventional HRSGs during shutdowns. During shutdowns the tubing in the high pressure superheaters 32 and 34 and reheaters drop rapidly in temperature since cold air flows through them as the gas turbine spins down. The stagnant superheated steam contained within the tubes of the superheater and reheater will condense on the inside of the tube walls as they cool and rain down to the bottom. In conventional HRSGs the thick wall bottom header remains hot and suffers a rapid quenching with hundreds of degrees differential between saturated water and hot metal. This often results in the header tube bore cracks after a number of cycles. Differential tube length contraction causes further damage since tubes are restrained by the headers and their piping. These problems are basically eliminated in the patent with use of thin wall U-bends 42 the only restraint coupling each downstream and upsteam tubes. In the conventional HRSGs headers rigidly constrain the lower and upper end of tubes in a row across the gas flow path. This causes tubes to contract at different rates with some in tension and others in compression across the length of the rigid headers. This puts severe stress on the critical tube to header joint. Additional stress develop at this joint, because the thick wall header remains hot while the thin wall tube rapidly cools with water quenching at this critical joint while the joint has to restrain the differential tube strain. The innovative concept eliminates the lower headers with their rigid constraints and the hundreds of thick to thin joints thereby eliminating problems observed in many HRSGs in cyclic operation.

Figure 2:
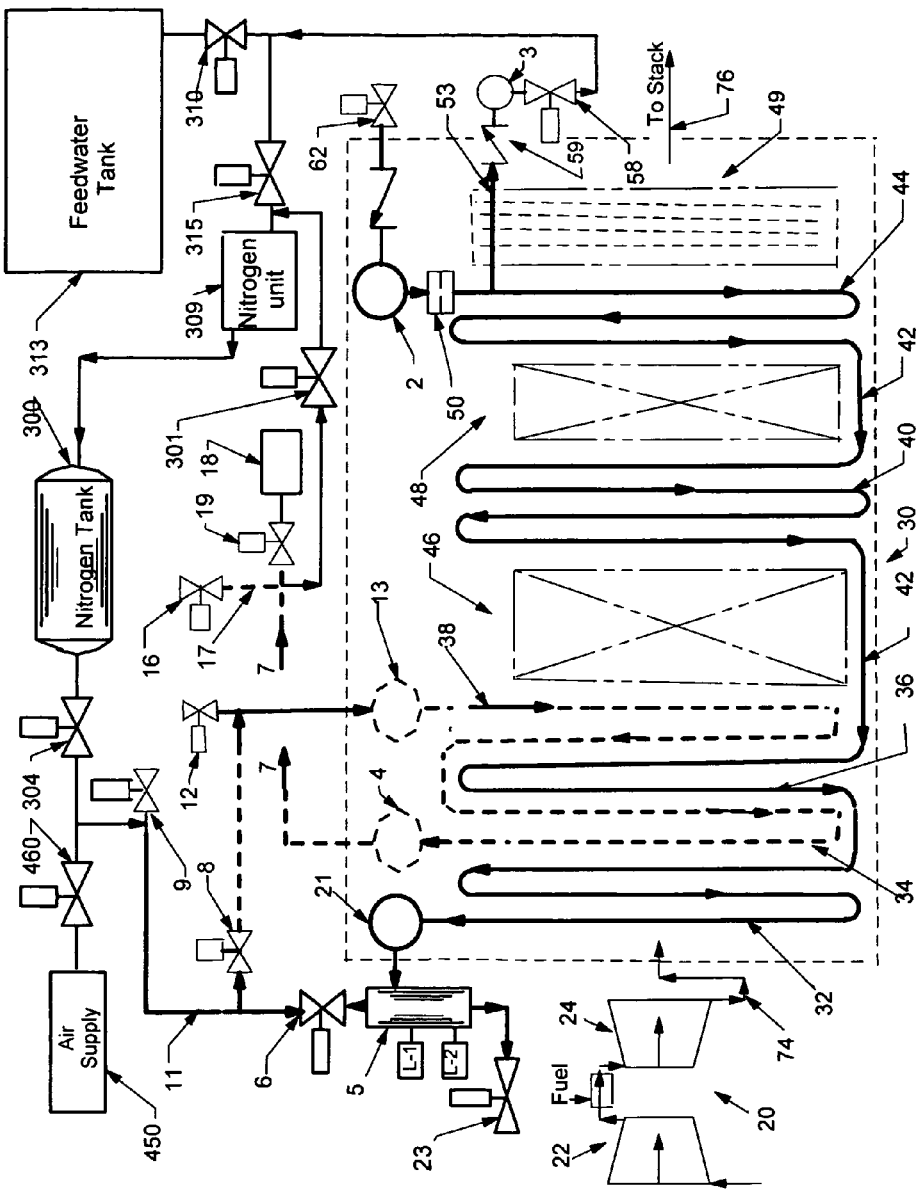
FIG. 2 schematically illustrates a HRSG with a nitrogen blanketing and air dewatering systems that implement the invention.

FIG. 2 schematically shows this inventions unique method of corrosion protection during cyclical operation and prolonged shutdown. For clarity the systems and valves used for normal steam generation and code compliance are not shown except to the extent they are used in corrosion protection embodiment of this invention. In cyclical service shutdown periods of more than one day may cool the HRSG sufficiently for steam pressure drop below ambient air pressure possibly permitting air to leak into the unit through numerous valve seats. The best way to prevent leakage of oxygen into the system is to fill all steam spaces with nitrogen under pressure to prevent corrosion during shutdown. The unique once-through flow path and system simplifies nitrogen blanketing of the unit. It allows the system and method to automatically blanket the HRSG with nitrogen gas during weekend shutdowns if the steam pressure falls near ambient air pressure. It allows the CC to be started fast without any delay associated with the blanketing system since only four automatic valves require operation. Referring to FIG. 2 nitrogen from a pressurized nitrogen storage tank 300 is connected to the main steam line 11 by opening valve 304 when the steam pressure in the HRSG drops to near ambient air pressure. High pressure header control valve 6 is opened and nitrogen will flow through receiver 5 into header 21 and communicate with all high pressure tubing in HRSG 30 and fill the tubing as steam condenses and maintain nitrogen pressure blanket by control valve 304. Thus by opening just two valves a steam blanket covers all water wetted surfaces in the high pressure system a characteristic of the simple flow path of this high pressure steam generator. Although the reheaters 38 and 34 should be dry after a shut down by venting steam to the condenser through valve 19 they would also be automatically filled with pressurized nitrogen by closing valve 19; opening valve 8; and connecting it to the nitrogen unit 309 by the reheater nitrogen outflow valve 301. The reheaters would fill with nitrogen as it circulates through valve 301 to the nitrogen unit 309 that: generates nitrogen, vents air, measures oxygen concentration, dries nitrogen with a desiccant system and pumps nitrogen gas to maintain the nitrogen tank 300 at pressure to replace the venting air and any leakage in the high pressure steam generator system. The purging of air from the reheaters may take an extended period of time to economize the size of nitrogen unit and nitrogen tank for the cycling duty expected. After purging the reheater of oxygen valve 309 would be closed. Pressurized nitrogen in the high pressure steam generator and reheater would be maintained by valve 304. The amount of nitrogen in the tank is modest for 5 days a week cycling with shutdowns at night and weekends. Nitrogen filling can be automated from the control room. Small commercial nitrogen generators using membrane technology are one the cost competitive means for cycling duty since a small unit can be operating continuously charging the tank 24/7 and demand flow from the tank is intermittent.

For long term layup a simple inventive method to dewater and fill the entire waterside of the HRSG with dry nitrogen automatically without opening any pressure boundaries and installing temporary piping as conventional units require. The best long term layup requires dewatering, drying and maintaining the waterside full of pressurized low oxygen low, low moisture 99.6% nitrogen as recommended by the ASME. FIG. 2 illustrates valves and systems for long term layup are embodied in the patent for dewatering HRSG. A turbine problem that prevents operation, initial installation of the HRSG, steam blow, maintenance or hydrostatic testing may be some of the of the procedures that require the HRSG to be dewatered in addition to long term layup. Conventional lower headers and numerous drain valves and interconnecting piping are eliminated by the invention to prevent tubing and joint damage during fast start HRSG service. In place of these problematic components and difficult to drain components in conventional units a unique air blowdown system and methods are described herein. A high pressure air supply system 450 is connected to the main steam line 11 by opening air supply valve 460. Opening high pressure steam control valve 6 and circuit drain valve 58 connects all of the high pressure heat exchanger tubing of the HRSG to the feedwater storage tank 313 by opening feedwater tank inlet valve 310. Opening air supply valve 460 permits the flow of pressurized air through all the tubing to dewater the high pressure steam generator tubing and headers. The air pressure from the air supply system 450 is slowly increased to minimize water hammer as water starts to flow out of the circuits through the high pressure serpentine circuits 32, 36, 40 and 44 through drain tubes 53 to the circuit drain header 3 under control of drain valve 58 through feed water tank inlet valve 310 to the feedwater tank 313. Initially air pressure and flow would be low with sufficient pressure to exceed the vertical tube static head and friction in the circuits. After the bulk of water is slowly removed the air pressure is increased to remove residual water pooling in the bottom of each U-bend by high velocity air. The high velocity air strips the water from the U-bends wets the walls, forming droplets and atomizing them and carries the small droplets around as a spray when velocities are sufficiently high through each of the circuits. To remove the wet film air dry is required to flow for many minutes to evaporate the water from the walls. When completed with the high velocity air-blow the same procedure would be used to remove the small volume condensate remaining in the lower U-bends of the initial reheater 38 and final reheater 34. The main steam line header valve 6 is closed. High pressure turbine bypass valve 8 would be opened as the intermediate turbine bypass valve 19 is opened to allow high velocity air to flow through the reheaters 38 and 34 into the condenser through the turbine bypass desuperheater 18. When the reheaters and high pressure heat transfer sections 32, 36, 40, and 44 are dry they would be then connected to the nitrogen system for long term layup. The air supply system 450 is shut down and valve 460 closed. The high pressure and reheater circuits would then be connected to the nitrogen tank 300 by opening nitrogen supply valve 304, opening valve 6 valve 8 and nitrogen unit inlet valve 301 and opening high pressure drain control valve 58 and opening the nitrogen unit inlet valve inlet valve 315. The nitrogen tank 300 is connected to the nitrogen unit 309 by a circulating line from the unit 309 controlled by the unit to supply nitrogen to the tank or to vent air or nitrogen from the unit for drying and purging. The high pressure steam generator tubing and reheater tubing are also connected to the nitrogen unit to permit circulation to dry and purge the tubing. The nitrogen unit 309 circulates dry nitrogen through all the high pressure and reheater tubing. The nitrogen will vent air, reduce oxygen and dry the circulating flow the specified dew point temperature to prepare the HRSG long term layup. The nitrogen unit will supply nitrogen to the nitrogen tank 300 to replace nitrogen used to replace air and leakage. The circulation will be turned off and only be started to check the system or opening the system for inspection but will periodically be started to charge the tank to maintain the water side of the HRSG pressurized with dry 99.6% nitrogen for the duration of the layup.

Figure 3:
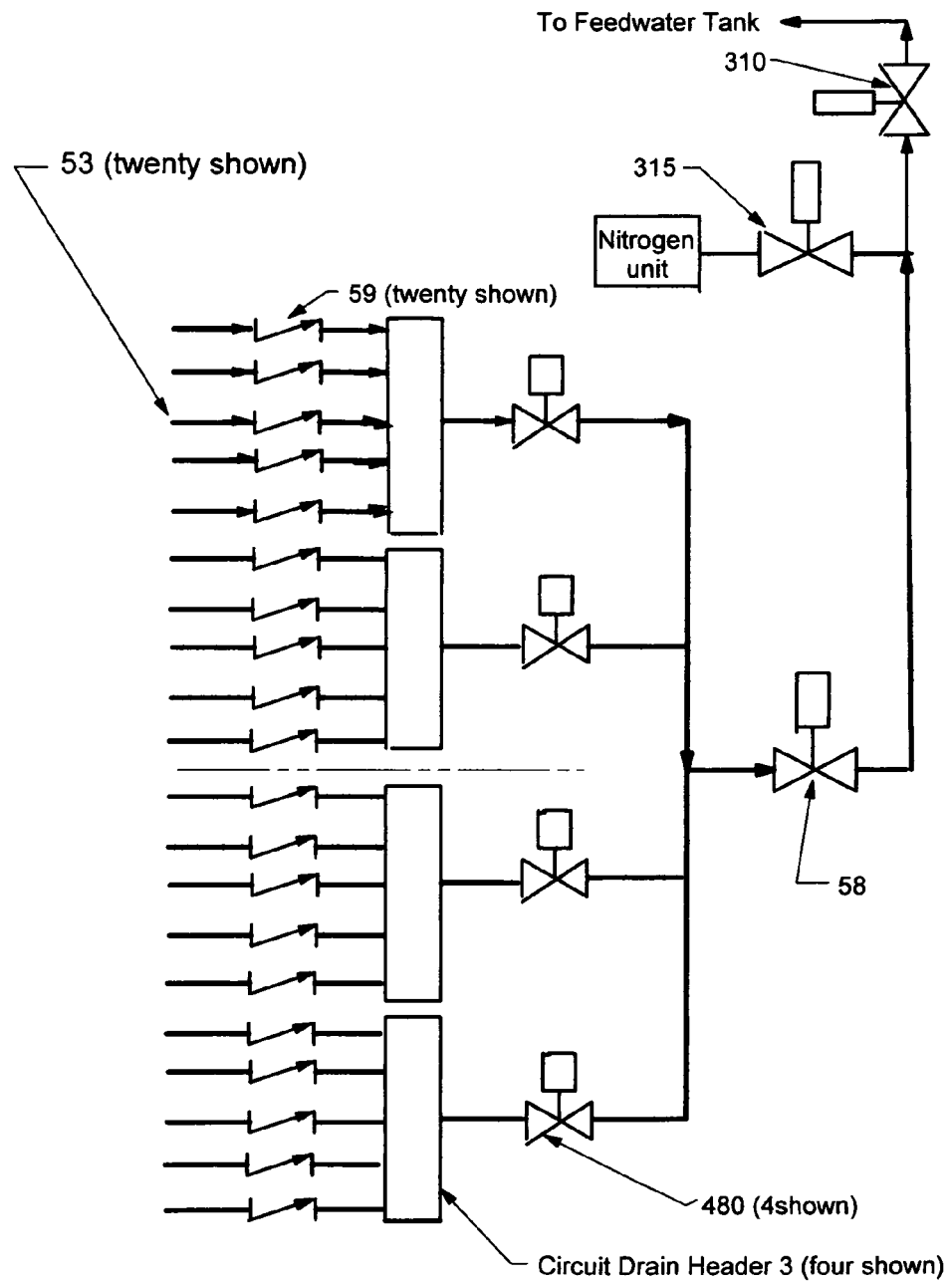
FIG. 3 schematically illustrates an alternate HRSG with the high pressure drain circuit headers arranged to reduce the size of the air supply system.

In HRSGs there typically two or three modules with 20 to 30 circuits per module with a header for each module. By designing two headers in place of one header per module and adding an isolation valve for each header the air supply system size is reduced to lower capital cost of the air supply system. FIG. 3 schematically shows an alternative embodiment of the patent to reduce the air supply 450 system to 25% of size of one used to dewater the entire HRSG. FIG. 3 is a top view looking down on the top of the high pressure drain tubes 53 of a two module HRSG with the dashed centerline separating the modules at the centerline of the gas flow path. Only 20 circuit drain tubes are shown for illustration (typically 60 to 90 are used in a large HRSG). In conventional practice modules of tube circuits would be assembled with 20 or thirty tubes and a single module for transportation and erection requirements. In FIG. 3 two modules each with two headers are shown with four drain isolation valves 480 to isolate circuits upstream of drain valve 58. By closing three of the isolation valves the size of the air supply system would be reduced by 75%. Repeating in sequence for each header all tubes would be dewatered. This embodiment of the invention could further reduce the air supply systems size by dividing each header again if warranted to reduce cost. All isolation valves 480 would be kept open for layup for nitrogen circulation during layup and operation.

Figure 4:
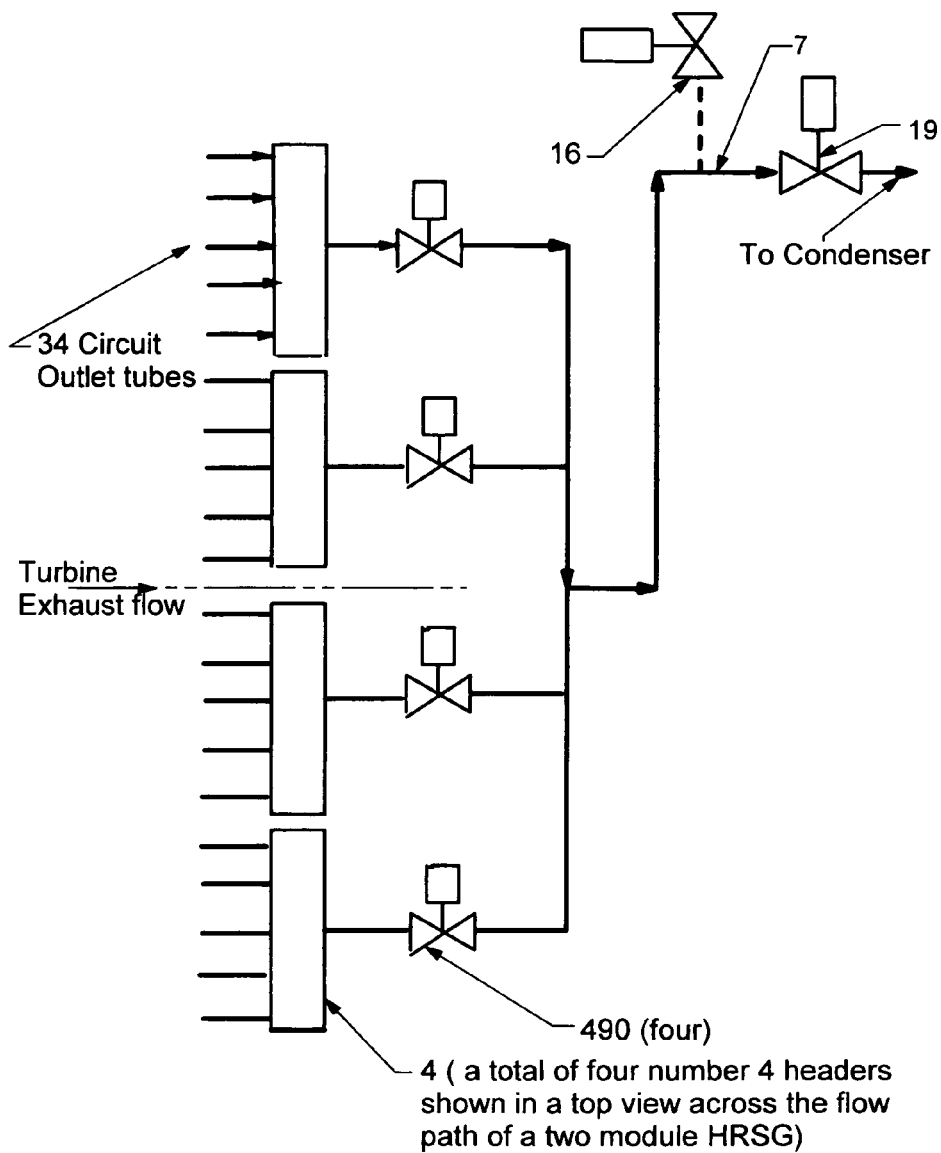
FIG. 4 schematically illustrates an alternate HRSG with the final reheater header outlet piping arranged to reduce the size of the air supply system.

Another embodiment of the invention similar to the above is shown in FIG. 4. FIG. 4 is a schematic of the final reheater outlet header arrangement to use reheater isolation valves 490 to reduce the size of the air supply system in similar method to the high pressure steam circuits.

While the invention has been described in connection with a certain embodiment related to the most serious problems now plaguing HRSGs and is considered the most practical and preferred embodiment, it is to be understood that the invention is not limited to the disclosed embodiment, but on the contrary, it is intended to cover various modifications such as horizontal tube HRSG with once-through circuits and equivalent arrangements included within the spirit and scope of the invention by one of ordinary skill in the art to the appended claims.

The invention claimed is:

1. A method of starting a high pressure heat recovery steam generator in a combined cycle system including a gas turbine; a high pressure superheater, a reheater section, a high pressure evaporator, a high pressure economizer, said heat recovery system disposed to extract energy in the form of high pressure steam from said gas turbine exhaust gas entering said final high pressure superheater section at the entrance of said heat recovery steam generator, a high pressure final superheater header drain receiver system at the high pressure steam headers, said header drain system including a drain valve to said condenser and an outlet steam valve to the main steam line, a circuit water drain system to remove and control the flow rate of water out of the high pressure steam generator circuits at the at the economizer inlet end, a final reheater section immediately downstream of said final high pressure superheater, said high pressure economizer circuits receiving water from a feedwater control valve regulating the flow from a high pressure pump, high pressure steam exiting said final high temperature superheater directed to the high pressure section of the steam turbine, and said reheater disposed along the steam flow path receives cold steam from the steam exiting the high pressure turbine, reheated steam is returned to the steam turbine systems, the method to start comprising:

flowing feed water into said high pressure economizer prior to start through the feedwater control valve into said economizer through said evaporator, and said high pressure superheater, causing the high pressure steam generator to be completely full of water prior to ignition of said gas turbine engine, at ignition said high pressure final superheater outlet header system drain valve is opened to discharge fluid out of final superheater headers and water-steam mixture is caused to flow out of the final superheater drain system as the water steam mixture heats and expands, water is also caused to flow out of said high pressure steam generator through said economizer by opening said high pressure circuit drain control valve, the flow from both drains controls the steam outlet pressure and temperature to produce dry steam, when dry steam is sensed said final superheater header receiver steam valve to the main steam line is opened and the receiver drain valve is closed, opening said steam outlet valve from the header receiver to said main steam line causes dry warming steam to flow into said main steam line and through said reheater by opening a high pressure steam turbine bypass valve, and an intermediate turbine bypass valve, diverting steam flow into the intermediate turbine bypass desuperheater and then into the condenser, controlling steam temperature and pressure with control obtained by adjusting the said high pressure steam receiver outlet steam valve and said circuit water drain control valve, at a preset temperature the circuit drain control valve is closed transferring temperature control function to the high pressure feedwater control valve to transition to normal mode of control as the steam generator warms, by diverting at a predetermined temperature a flow of steam to the high pressure turbine and intermediate turbine to warm the turbine systems as steam temperature and pressure are increased as the startup control system transitions the water evaporation dryout zone to its normal position in the high pressure evaporator.

2. A method as in claim 1, to further control said high pressure steam generator and said final reheater outlet temperature in off-design over temperature conditions and severe transients, the method comprising:

adjusting the position of the dryout zone in the high pressure steam generator circuit for adding or subtracting heat transfer area in superheater, said feedwater control valve increases flow to locate the dry out zone into the superheater reducing area and preventing over temperature outlet steam flow while using the high pressure circuit drain control valve to prevent overshoots with a rate of control to rapidly reduce area, said high pressure circuit drain controlvalve is rapidly opened to increase area to increase temperature preventing damaging wet steam excursions in rapid gas turbine download transients.

3. A method as in claim 1, of nitrogen blanketing said high pressure heat recovery steam generator and said reheater during cyclic operational short period shut downs of the combine cycle, the method comprising;

retaining heat in said steam generator high pressure steam generator by isolating it at shutdown by closing outlet steam lines, drain lines and feedwater inlet control valve to and stack damper if installed, said reheaters are vented to the condenser for several minutes to evaporate any condensation while they are hot by opening the turbine bypass valves, the bypass valves are then closed to isolate the reheater, said nitrogen tank is connected to the main steam line by the nitrogen supply valve and nitrogen is caused to flow into the steam spaces and pressure is kept above atmospheric and said main steam lines are maintained above atmospheric pressure by the flow of nitrogen to replace steam as it condenses to near atmospheric pressure, said high pressure turbine bypass valve is opened to connect said reheaters to said main steam line and thereby connect said reheaters to the nitrogen supply, a nitrogen valve is opened in the hot reheater line to connect it to the a nitrogen unit to circulate nitrogen through the reheaters, said high pressure steam outlet valve to said main steam line on the header receiver drain system to connect the high pressure steam generator water side of the steam generator through said main steam line to said nitrogen tank to replace steam as it cools, nitrogen filling all the space above the water and all the water wetted surfaces.

4. A method as in claim 1, of dewatering the heat recovery steam generator, comprising;

flowing air into to said main steam line from said air supply system valve, closing the high pressure turbine by-pass valve and opening the main steam line valve to said final superheater receiver header thus flowing pressurized air into the circuits, opening the circuit drain valve and said feedwater tank inlet valve to force water out of the circuits into the feedwater tank slowly, when most of the water is removed air pressure is increased to blow remaining water from said circuits to the feedwater tank to dry the tubes, close said main steam line valve to final high pressure receiver superheater headers and open the high pressure turbine bypass valve and the intermediate steam turbine bypass valve to the reheater thereby directing air through the reheaters and through the bypass bypass dusuperheater into said condenser, increase air flow to blow residual condensate from the said reheaters with high velocity air.

5. A method as in claim 1, of long term layup of said high pressure steam generator and said reheater, such method comprising;

said high pressure steam generator and said reheater are laid up for long periods dry filled with nitrogen, after dewatering said high pressure steam generator and said reheaters, said nitrogen tank is connected to the main steam line and said high pressure turbine bypass valve is opened, said high pressure steam header steam receiver outlet to said main steam line valve is opened to connect and flow nitrogen to fill said high pressure steam generator circuits and said reheater circuits, said high pressure circuit drain control valve is opened to circulate the nitrogen to said nitrogen unit by opening a inlet valve to said nitrogen unit from the said circuit drain valve discharge line, a reheater to nitrogen unit isolation valve is also opened and dry nitrogen is circulated through said high pressure turbine bypass valve through said reheaters and returned back to said nitrogen unit, said nitrogen unit circulates nitrogen from said high pressure steam generator and reheater back to the nitrogen tank drying and venting air, reducing oxygen levels to prevent corrosion, said nitrogen supply unit is turned off and periodically started to then maintains the pressure in the system above ambient to account for valve seepage and periodically checks the system automatically for the duration of the layup.

* * * * *